US012766633B2

(12) United States Patent
Nomaru et al.

(10) Patent No.: US 12,766,633 B2
(45) Date of Patent: Oct. 20, 2026

(54) OPTICAL ELEMENT ASSEMBLY

(71) Applicant: DISCO CORPORATION, Tokyo (JP)

(72) Inventors: Keiji Nomaru, Tokyo (JP); Hideo Matsuda, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 550 days.

(21) Appl. No.: 18/470,829

(22) Filed: Sep. 20, 2023

(65) Prior Publication Data

US 2024/0116134 A1 Apr. 11, 2024

(30) Foreign Application Priority Data

Oct. 7, 2022 (JP) ................................ 2022-162198

(51) Int. Cl.

| | |
|---|---|
| ***B23K 26/064*** | (2014.01) |
| ***B23K 26/70*** | (2014.01) |
| ***G02B 1/113*** | (2015.01) |

(52) U.S. Cl.

CPC ........ *B23K 26/0652* (2013.01); *B23K 26/702* (2015.10); *G02B 1/113* (2013.01)

(58) Field of Classification Search

CPC .............. B23K 26/0652; B23K 26/702; B23K 2101/40; G02B 1/113

See application file for complete search history.

(56) References Cited

U.S. PATENT DOCUMENTS 5,568,315 A * 10/1996 Shuman .............. G11B 7/1362
250/225

FOREIGN PATENT DOCUMENTS

JP 2007152355 A 6/2007

* cited by examiner

*Primary Examiner* — Robert G Bachner
(74) *Attorney, Agent, or Firm* — Greer Burns & Crain Ltd.

(57) ABSTRACT

An optical element assembly includes a first optical element and a second optical element. A reflective surface is formed in the first optical element, the second optical element is bonded to the reflective surface of the first optical element, and the reflective surface is shielded from ambient air.

9 Claims, 4 Drawing Sheets

OPTICAL ELEMENT ASSEMBLY

BACKGROUND OF THE INVENTION

Field of the Invention

The present invention relates to an optical element assembly that reflects a laser beam.

Description of the Related Art

A wafer on which a plurality of devices such as integrated circuits (ICs) and large-scale integration (LSI) circuits are formed on a front surface in such a manner as to be marked out by a plurality of planned dividing lines that intersect is divided into individual device chips by a laser processing apparatus, and the device chips obtained by the dividing are used for pieces of electrical equipment such as mobile phones and personal computers.

The laser processing apparatus is substantially configured by a chuck table that holds a wafer, a laser beam irradiation unit that irradiates the wafer held by the chuck table with a laser beam, and a processing feed mechanism that executes processing feed of the chuck table and the laser beam irradiation unit relatively in an X-axis direction and a Y-axis direction, and can process the wafer with high accuracy (for example, refer to Japanese Patent Laid-open No. 2007-152355).

Further, the laser beam irradiation unit is configured by a laser oscillator that emits the laser beam, a light collector that focuses the laser beam emitted by the laser oscillator on the wafer held by the chuck table, and an optical system that is disposed between the laser oscillator and the light collector and introduces the laser beam from the laser oscillator to the light collector with high accuracy.

SUMMARY OF THE INVENTION

The optical system that configures the above-described laser beam irradiation unit is configured by optical elements such as a collecting lens, a beam splitter, and a mirror. There is a problem that the optical elements deteriorate due to transmission and reflection of a laser beam and therefore need to be replaced periodically or at a given timing.

In particular, in the optical element such as a mirror in which a substrate is coated with a reflective film, there is a problem that, since a charge is generated at the surface of a reflective surface coated with the reflective film and adsorbs dust or gas in the surroundings, loss and quality lowering of a laser beam with which the reflective surface is irradiated occur and the optical element is broken due to irradiation of the dust or gas adsorbed by the reflective surface with the laser beam. Therefore, there is a problem that the optical element needs to be replaced comparatively frequently and this is very troublesome and uneconomic.

Thus, an object of the present invention is to provide an optical element assembly that can resolve a problem that the optical element assembly needs to be replaced comparatively frequently and this is very troublesome and uneconomic, without causing loss and quality lowering of a laser beam with which a reflective surface of an optical element is irradiated.

In accordance with an aspect of the present invention, there is provided an optical element assembly that reflects a laser beam. The optical element assembly includes a first optical element and a second optical element. Either one optical element of the first optical element and the second optical element has a reflective surface, the other optical element is bonded to the reflective surface, and the reflective surface is shielded from ambient air.

Preferably, the first optical element and the second optical element are each configured by a right-angle prism, a bottom surface of one of the right-angle prisms is coated with a reflective film to be made into the reflective surface, and a bottom surface of the other of the right-angle prisms is bonded to the reflective film. Preferably, the first optical element is configured by a flat plate, the second optical element is configured by a right-angle prism, either one surface of a surface of the flat plate or a bottom surface of the right-angle prism is coated with a reflective film to be made into the reflective surface, and the other surface of the surface of the flat plate or the bottom surface of the right-angle prism is bonded to the reflective film.

Preferably, the first optical element and the second optical element are each configured by a flat plate, a surface of one of the flat plates is coated with a reflective film to be made into the reflective surface, and a surface of the other of the flat plates is bonded to the reflective film. Preferably, the first optical element and the second optical element are each configured by a flat plate, a surface of one of the flat plates is coated with a reflective film to be made into the reflective surface, and a surface of the other of the flat plates is bonded with a space that is formed by interposing a partition wall surrounding the circumference of the reflective film and is sealed. Preferably, the first optical element is configured by a flat plate, the second optical element is configured by a right-angle prism, a bottom surface of the right-angle prism is a reflective surface at which the laser beam is totally reflected, and the flat plate is bonded with a space that is formed by a partition wall surrounding the circumference of the reflective surface and is sealed.

According to the optical element assembly of the present invention, the reflective surface is shielded from ambient air, and adsorption of dust or gas in the surroundings is not caused. Thus, loss of the laser beam and the lowering of the quality of the laser beam are suppressed. In addition, the problem that replacement of the optical element assembly needs to be executed comparatively frequently is resolved owing to reduction in breakdown of the optical element assembly.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An optical element assembly that reflects a laser beam according to an embodiment of the present invention will be described in detail below with reference to the accompanying drawings.

Figure 1:
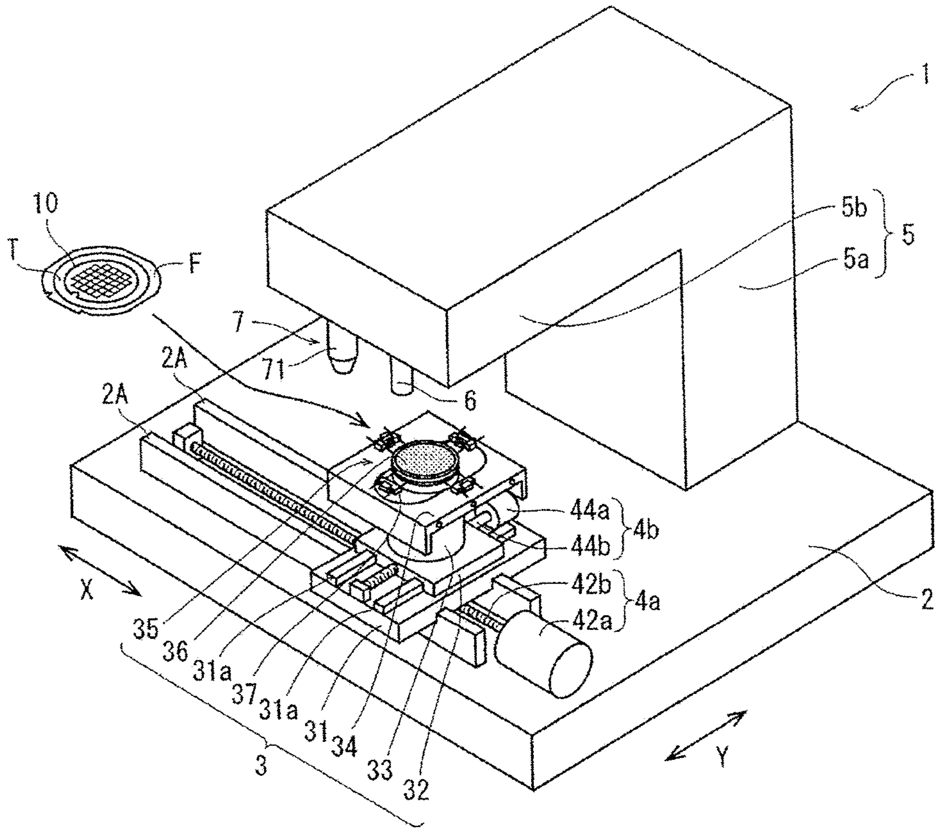
FIG. 1 is an overall perspective view of a laser processing apparatus.

In FIG. 1, an overall perspective view of a laser processing apparatus 1 in which the optical element assembly of the present embodiment is disposed is illustrated. The laser processing apparatus 1 is an apparatus that executes laser processing for a wafer 10 held by an annular frame F like illustrated one through a protective tape T. The laser processing apparatus 1 is disposed on a base 2 and includes at least a laser beam irradiation unit 7 that irradiates the wafer 10 with a laser beam.

The laser processing apparatus 1 includes, in addition to the above-described laser beam irradiation unit 7, a holding unit 3 that holds the wafer 10, an imaging unit 6 that images the wafer 10 held by the holding unit 3 and executes a position adjustment step, an X-axis movement mechanism 4*a* that moves the holding unit 3 in an X-axis direction, a Y-axis movement mechanism 4*b* that moves the holding unit 3 in a Y-axis direction orthogonal to the X-axis direction, a frame body 5 including a vertical wall part 5*a* erected on a lateral side of the X-axis movement mechanism 4*a* and the Y-axis movement mechanism 4*b* over the base 2 and a horizontal wall part 5*b* that extends in the horizontal direction from an upper end part of the vertical wall part 5*a*, and a controller that is not illustrated.

The holding unit 3 is means that includes the XY-plane specified by the X-coordinate and the Y-coordinate as a holding surface and holds the wafer 10. As illustrated in FIG. 1, the holding unit 3 includes a rectangular X-axis direction movable plate 31 mounted over the base 2 movably in the X-axis direction, a rectangular Y-axis direction movable plate 32 mounted over the X-axis direction movable plate 31 movably in the Y-axis direction, a circular cylindrical support column 33 fixed to the upper surface of the Y-axis direction movable plate 32, and a rectangular cover plate 34 fixed to the upper end of the support column 33. A chuck table 35 that passes through a long hole formed in the cover plate 34 and extends upward is disposed in the cover plate 34. The chuck table 35 is configured to be rotatable by a rotational drive mechanism that is housed in the support column 33 and is not illustrated. In the upper surface of the chuck table 35, a circular suction adhesion chuck 36 that is formed of a porous material having air permeability and includes the XY-plane specified by the X-coordinate and the Y-coordinate as a holding surface is disposed. The suction adhesion chuck 36 is connected to suction means that is not illustrated, by a flow path that passes through the support column 33. Four clamps 37 that grasp the annular frame F when the wafer 10 is held over the chuck table 35 are disposed at equal intervals around the suction adhesion chuck 36.

The X-axis movement mechanism 4*a* converts rotational motion of a motor 42*a* to linear motion through a ball screw 42*b* and transmits the linear motion to the X-axis direction movable plate 31 to move the X-axis direction movable plate 31 in the X-axis direction along a pair of guide rails 2A disposed along the X-axis direction on the base 2. The Y-axis movement mechanism 4*b* converts rotational motion of a motor 44*a* to linear motion through a ball screw 44*b* and transmits the linear motion to the Y-axis direction movable plate 32 to move the Y-axis direction movable plate 32 in the Y-axis direction along a pair of guide rails 31*a* disposed along the Y-axis direction on the X-axis direction movable plate 31.

An optical system that configures the above-described laser beam irradiation unit 7 and the imaging unit 6 are housed inside the horizontal wall part 5*b* of the frame body 5. On the lower surface side of a tip part of the horizontal wall part 5*b*, a light collector 71 that configures part of the laser beam irradiation unit 7 and focuses a laser beam on the wafer 10 is disposed. The imaging unit 6 is means that images the wafer 10 held by the holding unit 3 and detects the position and orientation of the wafer 10, a laser processing position that should be irradiated with the laser beam, and so forth and is disposed at a position adjacent to the above-described light collector 71 in the X-axis direction indicated by an arrow X in the diagram.

Figure 2:
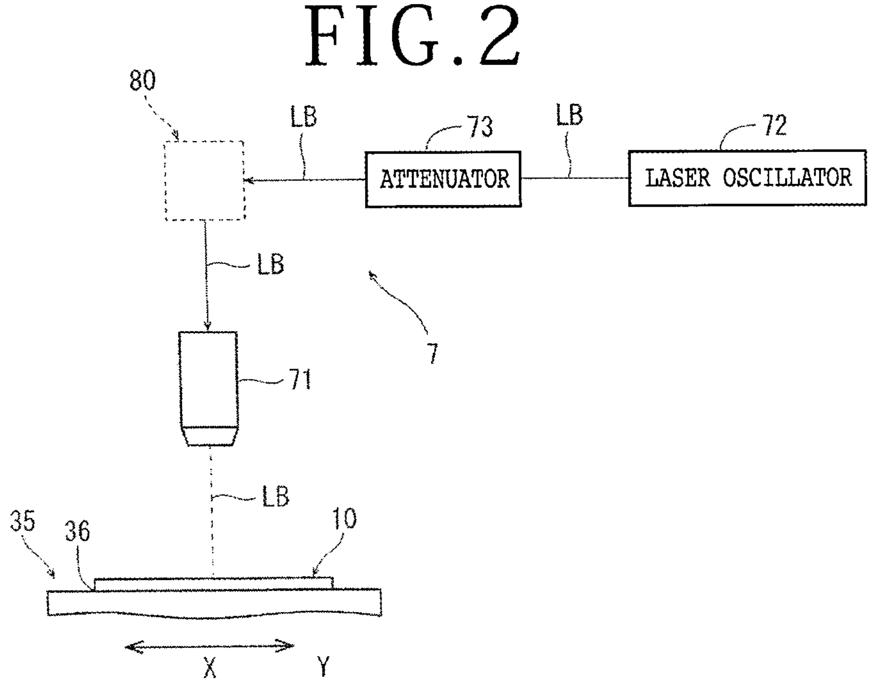
FIG. 2 is a block diagram illustrating an optical system of a laser beam irradiation unit disposed in the laser processing apparatus illustrated in FIG. 1.

In FIG. 2, a block diagram illustrating the outline of the optical system of the above-described laser beam irradiation unit 7 is illustrated. The laser beam irradiation unit 7 includes a laser oscillator 72 that emits a laser beam LB, an attenuator 73 that adjusts the output power of the laser beam LB emitted by the laser oscillator 72, an optical element assembly 80 that has a reflective surface whose inclination angle is set to 45 degrees with respect to the laser beam LB and reflects the laser beam LB at a right angle, and the light collector 71 including a collecting lens (illustration is omitted) that focuses the laser beam LB to irradiate the wafer 10 held by the chuck table 35 with the laser beam LB.

The controller is configured by a computer and includes a central processing unit (CPU) that executes calculation processing according to a control program, a read-only memory (ROM) that stores the control program and so forth, a readable-writable random access memory (RAM) for temporarily storing a detection value detected, a calculation result, and so forth, an input interface, and an output interface (illustration about details is omitted). The X-axis movement mechanism 4*a*, the Y-axis movement mechanism 4*b*, the imaging unit 6, the laser beam irradiation unit 7, and so forth are connected to the controller and are controlled.

The laser processing apparatus 1 has the configuration described above substantially. More specific description will be made regarding an embodiment of the optical element assembly 80 that is disposed in the laser beam irradiation unit 7 and reflects the laser beam LB.

The optical element assembly 80 configured on the basis of the present invention includes a first optical element and a second optical element and has a configuration in which a reflective surface is formed in either one optical element of the first optical element and the second optical element and the other optical element is bonded to the reflective surface to cause the reflective surface to be shielded from ambient air. Working examples of the optical element assembly 80 according to the embodiment of the present invention will be described below with respect to FIG. 3A to FIG. 7B.

Figure 3A:
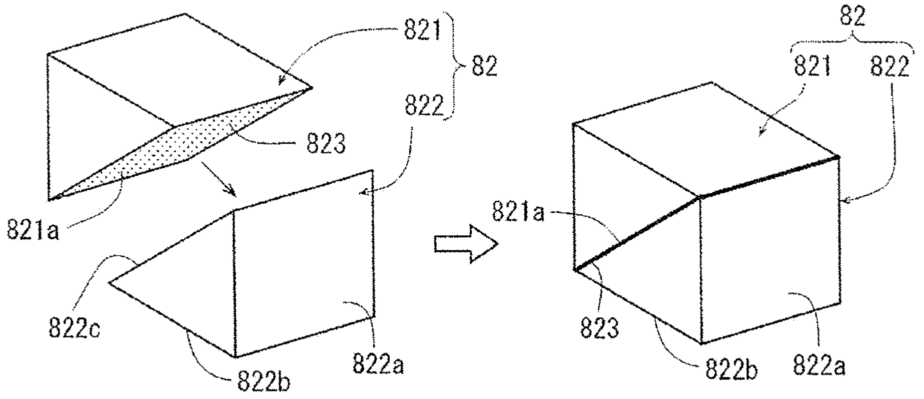
FIG. 3A is a perspective view illustrating a first working example of an optical element assembly disposed in the optical system illustrated in FIG. 2.
Figure 3B:
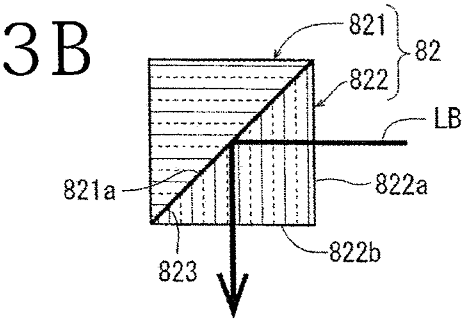
FIG. 3B is a sectional view illustrating a form in which a laser beam is reflected by the optical element assembly illustrated in FIG. 3A.

In FIG. 3A and FIG. 3B, an optical element assembly 82 that is a first working example of the above-described optical element assembly 80 is illustrated. As illustrated on the left side of FIG. 3A, the first optical element that configures the optical element assembly 82 illustrated is a right-angle prism 821, and the second optical element is also configured by a right-angle prism 822. The right-angle prisms 821 and 822 are formed of a transparent medium such as glass or artificial crystal, for example. The bottom surface that configures the hypotenuse when the right-angle prism 821 configuring the first optical element is viewed in a cross-section is coated with a reflective film 823 and a reflective surface 821*a* is formed, and a bottom surface 822*c* of the other right-angle prism 822 that is not coated with a reflective film is bonded to the reflective surface 821*a* of the right-angle prism 821 on which the reflective film 823 is formed, so that the right-angle prisms 821 and 822 are integrated as illustrated on the right side of FIG. 3A. This makes the state in which the reflective film 823 of the right-angle prism 821 configuring the first optical element is shielded from ambient air.

The reflective film 823 is formed by aluminum (Al) coating, for example. However, the present invention is not limited thereto, and it is also possible to employ well-known reflective film coating, for example, metal coating of gold or silver. Moreover, an appropriate dielectric multilayer film may be formed on the surface of the metal coating to protect it. The method for bonding the reflective surface 821*a* of the right-angle prism 821 and the bottom surface 822*c* of the right-angle prism 822 to each other is not particularly limited to any method. For example, they can be bonded to each other by diffusion bonding without using an adhesive or the like.

The optical element assembly 82 formed as above is employed as the optical element assembly 80 of the optical system of the laser beam irradiation unit 7 described with reference to FIG. 2, and one side surface that forms the right angle of the right-angle prism 822 configuring the second optical element is employed as an incident surface 822*a*, and the other side surface is employed as an exit surface 822*b*. That is, as illustrated in FIG. 3B, the laser beam LB emitted from the attenuator 73 of the above-described laser beam irradiation unit 7 is made to be incident from the incident surface 822*a* of the right-angle prism 822 and is reflected at the reflective film 823 that configures the reflective surface 821*a* of the right-angle prism 821 set to be at 45 degrees with respect to the laser beam LB. Thus, the optical path is changed toward the lower side at a right angle, and the laser beam LB is emitted from the exit surface 822*b* of the right-angle prism 822 toward the above-described light collector 71.

It is preferable to execute, for example, anti-reflective (AR) coating in which coating with $MgF_2$ is implemented for the incident surface 822*a* of the above-described right-angle prism 822 for the purpose of antireflection. Further, the above-described reflective film 823 is not necessarily limited to coating the bottom surface of the right-angle prism 821 configuring the first optical element. The bottom surface 822*c* of the right-angle prism 822 configuring the second optical element may be coated with the reflective film 823 and be made into a reflective surface, and the laser beam LB incident from the incident surface 822*a* of the right-angle prism 822 may be reflected by the reflective film 823 that coats the bottom surface 822*c* and be emitted from the exit surface 822*b*.

According to the optical element assembly 82 of the above-described first working example, even when a charge is generated at the surface coated with the reflective film 823 due to irradiation with the laser beam LB, adsorption of dust or gas in the surroundings is not caused because the reflective film 823 is shielded from ambient air. Thus, loss of the laser beam LB and the lowering of the quality of the laser beam LB are suppressed. In addition, the problem that replacement of the optical element assembly 82 needs to be executed comparatively frequently is resolved owing to reduction in breakdown of the optical element assembly 82.

Figure 4A:
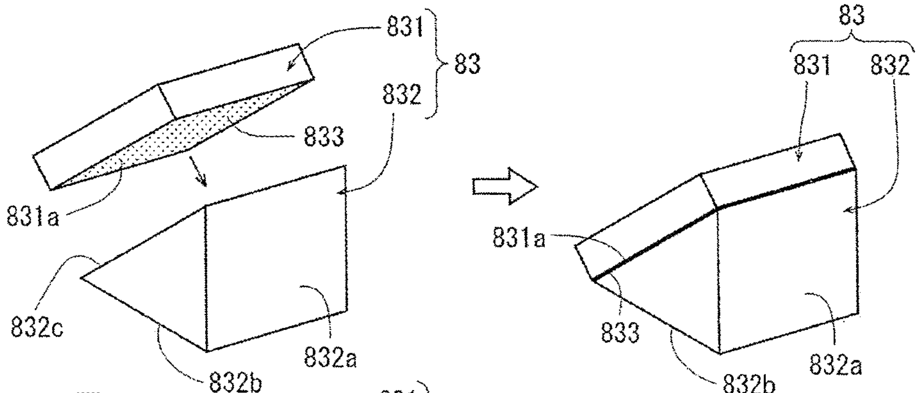
FIG. 4A is a perspective view illustrating a second working example of the optical element assembly disposed in the optical system illustrated in FIG. 2.
Figure 4B:
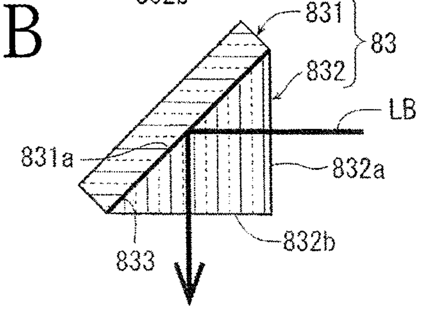
FIG. 4B is a sectional view illustrating a form in which the laser beam is reflected by the optical element assembly illustrated in FIG. 4A.

In FIG. 4A and FIG. 4B, an optical element assembly 83 that is a second working example of the above-described optical element assembly 80 is illustrated. As illustrated on the left side of FIG. 4A, the first optical element that configures the optical element assembly 83 illustrated is a flat plate 831, and the second optical element is configured by a right-angle prism 832. The right-angle prism 832 configuring at least the second optical element of the first and second optical elements is formed of a transparent medium such as glass or artificial crystal as in the above-described first working example. One surface (lower surface side in the diagram) of the flat plate 831 is coated with a reflective film 833 to be made into a reflective surface 831*a*, and a bottom surface 832*c* of the right-angle prism 832 that is not coated with the reflective film 833 is bonded to the reflective surface 831*a* of the flat plate 831 on which the reflective film 833 is formed, so that the flat plate 831 and the right-angle prism 832 are integrated as illustrated on the right side of FIG. 4A. This makes the state in which the reflective film 833 of the flat plate 831 configuring the first optical element is shielded from ambient air.

For the reflective film 833, similarly to the above-described reflective film 823, for example, Al coating or another kind of well-known reflective film coating, for example, metal coating of gold or silver, can be employed. Moreover, an appropriate dielectric multilayer film may be formed on the surface of the metal coating to protect it. The reflective surface 831*a* of the flat plate 831 and the bottom surface 832*c* of the right-angle prism 832 can be bonded to each other by diffusion bonding without using an adhesive or the like, for example, similarly to the above.

The optical element assembly 83 formed as above is employed as the optical element assembly 80 of the optical system described with reference to FIG. 2, one side surface of the right-angle prism 832 configuring the second optical element is employed as an incident surface 832*a*, and the other side surface is employed as an exit surface 832*b*. That is, as illustrated in FIG. 4B, the laser beam LB emitted from the above-described attenuator 73 is made to be incident from the incident surface 832*a* of the right-angle prism 832 configuring the second optical element and is reflected at the reflective surface 831*a* of the flat plate 831 configuring the first optical element. Thus, the optical path is changed toward the lower side at a right angle, and the laser beam LB is emitted from the exit surface 832*b* of the right-angle prism 832 toward the light collector 71 of the above-described optical system.

It is preferable to execute, for example, AR coating in which coating with $MgF_2$ is implemented for the incident surface 832*a* of the above-described right-angle prism 832 for the purpose of antireflection as in the first working example. Further, the above-described reflective film 833 is not necessarily limited to coating the one surface of the flat plate 831 configuring the first optical element. The bottom surface 832*c* of the right-angle prism 832 configuring the second optical element may be coated with the reflective film 833 and be made into a reflective surface, and the laser beam LB incident from the incident surface 832*a* of the right-angle prism 832 may be reflected by the reflective film 833 that coats the bottom surface 832*c* and be emitted from the exit surface 832*b*.

According to the optical element assembly 83 of the above-described second working example, even when a charge is generated at the surface of the reflective film 833 due to irradiation with the laser beam LB, adsorption of dust or gas in the surroundings is not caused because the reflective film 833 is shielded from ambient air. Thus, loss of the laser beam LB and the lowering of the quality of the laser beam LB are suppressed. In addition, the problem that replacement of the optical element assembly 83 needs to be executed comparatively frequently is resolved owing to reduction in breakdown of the optical element assembly 83.

Figure 5A:
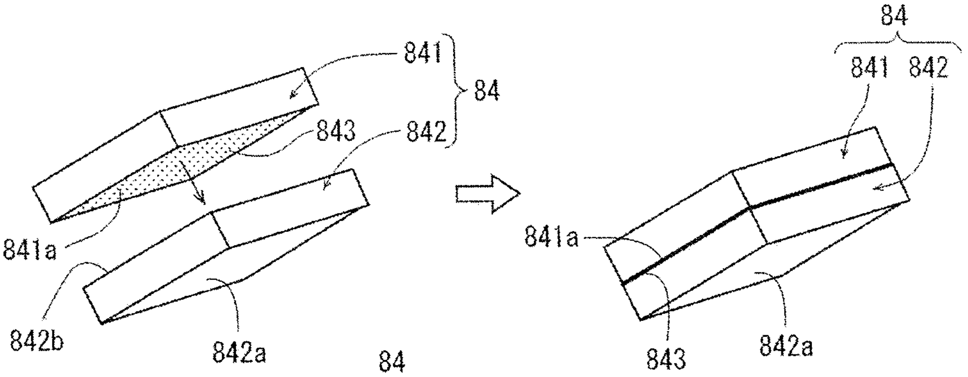
FIG. 5A is a perspective view illustrating a third working example of the optical element assembly disposed in the optical system illustrated in FIG. 2.
Figure 5B:
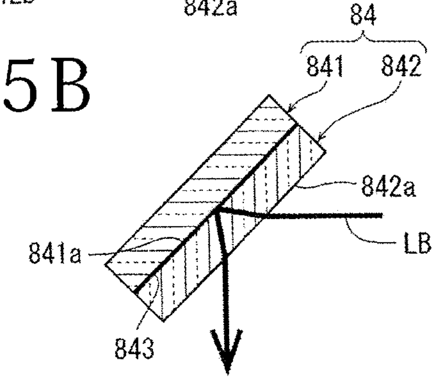
FIG. 5B is a sectional view illustrating a form in which the laser beam is reflected by the optical element assembly illustrated in FIG. 5A.

In FIG. 5A and FIG. 5B, an optical element assembly 84 that is a third working example of the above-described optical element assembly 80 is illustrated. As illustrated on the left side of FIG. 5A, the first optical element that configures the optical element assembly 84 illustrated is a flat plate 841, and the second optical element is also configured by a flat plate 842. The flat plate 842 configuring at least the second optical element of the first and second optical elements is formed of a transparent medium such as glass or artificial crystal. One surface (lower surface side in the diagram) of the flat plate 841 is coated with a reflective film 843 to be made into a reflective surface 841*a*, and one surface 842*b* of the other flat plate 842 that is not coated with the reflective film 843 is bonded to the reflective surface 841*a* of the flat plate 841 on which the reflective film 843 is formed, so that the flat plates 841 and 842 are integrated as illustrated on the right side of FIG. 5A. This makes the state in which the reflective film 843 of the flat plate 841 configuring the first optical element is shielded from ambient air.

For the reflective film 843, similarly to the reflective films of the above-described working examples, for example, Al coating or another kind of well-known reflective film coating, for example, metal coating of gold or silver, can be employed. Moreover, an appropriate dielectric multilayer film may be formed on the surface of the metal coating to protect it. The reflective surface 841*a* of the flat plate 841 and the one surface 842*b* of the flat plate 842 can be bonded to each other by diffusion bonding without using an adhesive or the like, for example, similarly to the above.

When the optical element assembly 84 that is formed as above and is the third working example is employed as the optical element assembly 80 of the optical system described with reference to FIG. 2, the other surface 842*a* of the flat plate 842 configuring the second optical element becomes an incident surface and an exit surface. That is, as illustrated in FIG. 5B, the laser beam LB emitted from the above-described attenuator 73 is made to be incident from the other surface 842*a* of the flat plate 842 and is reflected at the reflective surface 841*a* of the flat plate 841. Thus, the optical path is changed toward the lower side at a right angle, and the laser beam LB is emitted from the surface 842*a* of the flat plate 842 toward the light collector 71 of the above-described optical system.

It is preferable to execute, for example, AR coating in which coating with $MgF_2$ is implemented for the surface 842*a* of the above-described flat plate 842 for the purpose of antireflection. Further, the above-described reflective film 843 is not necessarily limited to coating a surface of the flat plate 841 configuring the first optical element. The one surface 842*b* of the flat plate 842 configuring the second optical element may be coated with the reflective film 843 and be made into a reflective surface, and the laser beam LB incident from the other surface 842*a* of the flat plate 842 may be reflected by the reflective film 843 that coats the one surface 842*b* and be emitted from the other surface 842*a*.

According to the optical element assembly 84 of the above-described third working example, even when a charge is generated at the surface of the reflective film 843 due to irradiation with the laser beam LB, adsorption of dust or gas in the surroundings is not caused because the reflective film 843 is shielded from ambient air. Thus, loss of the laser beam LB and the lowering of the quality of the laser beam LB are suppressed. In addition, the problem that replacement of the optical element assembly 84 needs to be executed comparatively frequently is resolved owing to reduction in breakdown of the optical element assembly 84.

Figure 6A:
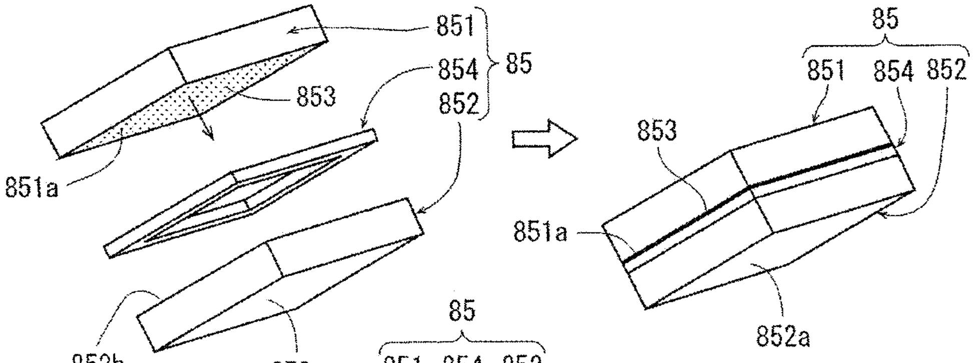
FIG. 6A is a perspective view illustrating a fourth working example of the optical element assembly disposed in the optical system illustrated in FIG. 2.
Figure 6B:
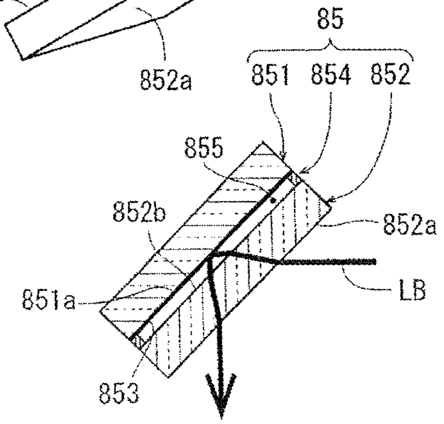
FIG. 6B is a sectional view illustrating a form in which the laser beam is reflected by the optical element assembly illustrated in FIG. 6A.

In FIG. 6A and FIG. 6B, an optical element assembly 85 that is a fourth working example of the above-described optical element assembly 80 is illustrated. As illustrated on the left side of FIG. 6A, the optical element assembly 85 illustrated includes a flat plate 851 as the first optical element and a flat plate 852 as the second optical element, and one surface of the flat plate 851 is coated with a reflective film 853 and is made into a reflective surface 851*a*. In addition, as illustrated in the diagram, a partition wall 854 that surrounds the circumference of the reflective film 853 is interposed between the flat plate 851 and the flat plate 852, the flat plate 851, the partition wall 854, and the flat plate 852 are bonded to each other to be integrated as illustrated on the right side of FIG. 6A, and a sealed space 855 is formed inside as illustrated in FIG. 6B. In the illustrated working example, at least the flat plate 852 is formed of a transparent medium such as glass or artificial crystal. This makes the state in which the reflective surface 851*a* coated with the reflective film 853 in the flat plate 851 is shielded from ambient air.

For the reflective film 853, similarly to the reflective films of the above-described working examples, for example, Al coating or another kind of well-known reflective film coating, for example, metal coating of gold or silver, can be employed. Moreover, an appropriate dielectric multilayer film may be formed on the surface of the metal coating to protect it. The reflective surface 851*a* of the above-described flat plate 851, the partition wall 854, and a surface 852*b* of the flat plate 852 can be bonded to each other with use of an adhesive, for example.

When the optical element assembly 85 formed as above is employed as the optical element assembly 80 of the optical system described with reference to FIG. 2, the other surface 852*a* of the flat plate 852 becomes an incident surface and an exit surface. As illustrated in FIG. 6B, the laser beam LB emitted from the above-described attenuator 73 is made to be incident from the other surface 852*a* of the flat plate 852, travels through the sealed space 855, and is reflected at the reflective surface 851*a* of the flat plate 851. Then, the laser beam LB is incident on the flat plate 852 through the space 855 and is emitted from the surface 852*a* of the flat plate 852 toward the above-described light collector 71 in such a manner as to make a right angle with respect to the angle at which the laser beam LB is incident on the optical element assembly 85. It is preferable to execute, for example, AR coating in which coating with $MgF_2$ is implemented for the surface 852*a* of the above-described flat plate 852 for the purpose of antireflection.

According to the optical element assembly 85 of the above-described fourth working example, even when a charge is generated at the surface of the reflective film 853 due to irradiation with the laser beam LB, adsorption of dust or gas in the surroundings is not caused because the reflective film 853 is shielded from ambient air. Thus, loss of the laser beam LB and the lowering of the quality of the laser beam LB are suppressed. In addition, the problem that replacement of the optical element assembly 85 needs to be executed comparatively frequently is resolved owing to reduction in breakdown of the optical element assembly 85.

Figure 7A:
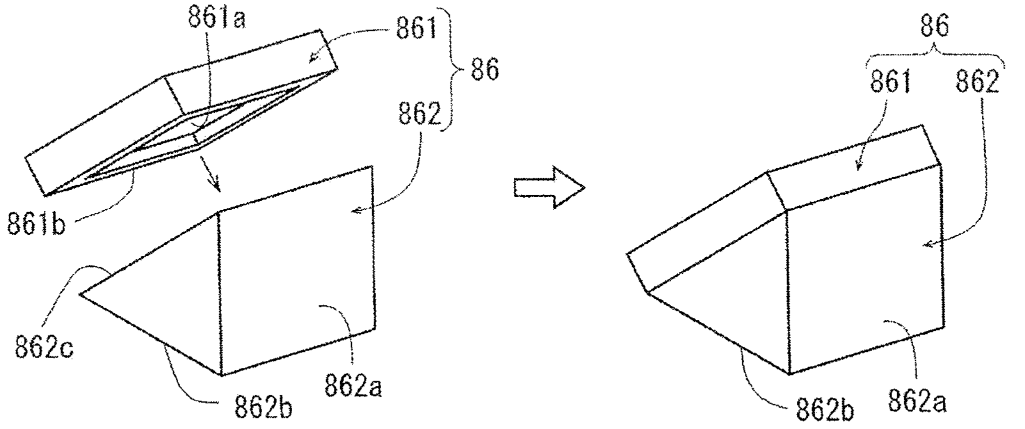
FIG. 7A is a perspective view illustrating a fifth working example of the optical element assembly disposed in the optical system illustrated in FIG. 2.
Figure 7B:
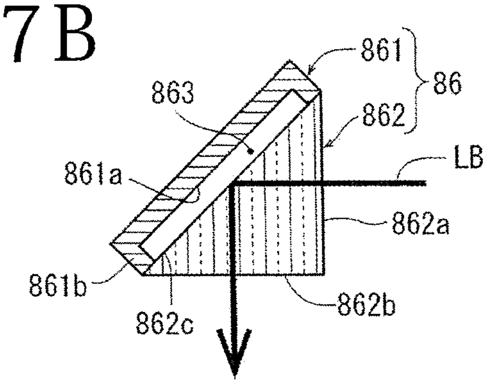
FIG. 7B is a sectional view illustrating a form in which the laser beam is reflected by the optical element assembly illustrated in FIG. 7A.

In FIG. 7A and FIG. 7B, an optical element assembly 86 that is a fifth working example of the above-described optical element assembly 80 is illustrated. As illustrated on the left side of FIG. 7A, the first optical element that configures the optical element assembly 86 illustrated is a flat plate 861, and the second optical element is configured by a right-angle prism 862. The right-angle prism 862 configuring at least the second optical element of the first and second optical elements is formed of a transparent medium such as glass or artificial crystal as in the above-described working examples. A partition wall 861*b* is erected at the circumference of one surface 861*a* opposed to a bottom surface 862*c* of the right-angle prism 862 in the flat plate 861 configuring the first optical element. In the optical element assembly 86, by bonding the partition wall 861*b* of the flat plate 861 to the bottom surface 862*c* of the right-angle prism 862 to integrate the flat plate 861 and the right-angle prism 862 as illustrated in FIG. 7A, a sealed space 863 is formed by the one surface 861*a* and the partition wall 861*b* of the flat plate 861 and the bottom surface 862*c* of the right-angle prism 862 as illustrated in FIG. 7B.

As illustrated in the diagram, one side surface of the right-angle prism 862 of the present working example is employed as an incident surface 862*a*, and the other side surface is employed as an exit surface 862*b*. The bottom surface 862*c* of the right-angle prism 862 of the present working example is a reflective surface at which the laser beam LB incident from the incident surface 862*a* is totally reflected toward the exit surface 862*b* at a right angle. That is, in the fifth working example, coating with a reflective film is unnecessary, and the bottom surface 862*c* configures the reflective surface. For the total reflection of the laser beam LB at a right angle at the bottom surface 862*c* of the right-angle prism 862, the refractive index of the medium of the right-angle prism 862 needs to be a refractive index that causes the total reflection, and a medium that allows the refractive index to become a desired value is selected as appropriate.

By integrating the flat plate 861 and the right-angle prism 862 as illustrated on the right side of FIG. 7A, the sealed space 863 is formed, and the bottom surface 862*c* of the right-angle prism 862 configuring the second optical element is shielded from ambient air as illustrated in FIG. 7B.

The above-described optical element assembly 86 is employed as the optical element assembly 80 of the optical system described with reference to FIG. 2, the one side surface of the right-angle prism 862 configuring the second optical element is employed as the incident surface 862*a*, and the other side surface is employed as the exit surface 862*b*. That is, as illustrated in FIG. 7B, the laser beam LB emitted from the attenuator 73 of the above-described optical system is made to be incident from the incident surface 862*a* of the right-angle prism 862 configuring the second optical element and is totally reflected at the bottom surface 862*c* of the right-angle prism 862. Thus, the optical path is changed toward the lower side at a right angle, and the laser beam LB is emitted from the exit surface 862*b* of the right-angle prism 862 toward the above-described light collector 71. It is preferable to execute, for example, AR coating in which coating with $MgF_2$ is implemented for the incident surface 862*a* of the above-described right-angle prism 862 for the purpose of antireflection.

According to the above-described optical element assembly 86, even when a charge is generated at the bottom surface 862*c* that is the reflective surface of the right-angle prism 862 due to irradiation with the laser beam LB, adsorption of dust or gas in the surroundings is not caused because the bottom surface 862*c* configuring the reflective surface is shielded from ambient air. Thus, loss of the laser beam LB and the lowering of the quality of the laser beam LB are suppressed. In addition, the problem that replacement of the optical element assembly 86 needs to be executed comparatively frequently is resolved owing to reduction in breakdown of the optical element assembly 86.

The flat plates configuring the first optical element through which the laser beam LB is not transmitted in the above-described working examples can be selected from an acrylic resin, an epoxy resin, and so forth in addition to the above-described glass and artificial crystal. Moreover, selection from members that do not allow transmission of light therethrough is also possible.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An optical element assembly that reflects a laser beam, the optical element assembly comprising:

a first optical element; and a second optical element, either one optical element of the first optical element and the second optical element having a reflective surface configured to reflect an entirety of the laser beam incident on thereon, the other optical element being bonded to the reflective surface, and the reflective surface being shielded from ambient air.

2. The optical element assembly according to claim 1, wherein the first optical element and the second optical element are each configured by a right-angle prism, a bottom surface of one of the right-angle prisms is coated with a reflective film to be made into the reflective surface, and a bottom surface of the other of the right-angle prisms is bonded to the reflective film.

3. The optical element assembly according to claim 1, wherein the first optical element is configured by a flat plate, the second optical element is configured by a right-angle prism, either one surface of a surface of the flat plate or a bottom surface of the right-angle prism is coated with a reflective film to be made into the reflective surface, and the other surface of the surface of the flat plate or the bottom surface of the right-angle prism is bonded to the reflective film.

4. The optical element assembly according to claim 1, wherein the first optical element and the second optical element are each configured by a flat plate, a surface of one of the flat plates is coated with a reflective film to be made into the reflective surface, and a surface of the other of the flat plates is bonded to the reflective film.

5. The optical element assembly according to claim 1, wherein the reflective surface is isolated from direct exposure to ambient air by the bonding between the optical elements.

6. The optical element assembly according to claim 1, wherein the reflective surface is a coating on either the first optical element or the second optical element at the incident surface where the first optical element and the second optical element are attached to each other.

7. An optical element assembly that reflects a laser beam, the optical element assembly comprising:

a first optical element;

a second optical element;

a reflective surface formed on one of the first optical element and the second optical element;

a partition wall disposed between the first optical element and the second optical element; and a sealed space defined by the first optical element, the second optical element, and the partition wall and is shielded from ambient air.

8. The optical element assembly according to claim 7, wherein the reflective surface is configured to totally reflect the laser beam incident thereon.

9. The optical element assembly according to claim 8, wherein the first optical element and the second optical element are each a flat plate.

* * * * *